(12) United States Patent
Waid et al.

(10) Patent No.: US 11,832,592 B2
(45) Date of Patent: Dec. 5, 2023

(54) POULTRY TRANSPORT CAGE WITH DOOR ASSEMBLY

(71) Applicants: Everett Waid, Fort Myers, FL (US); Timothy G Youngquist, Fort Myers, FL (US); John M Brown, Fort Myers, FL (US)

(72) Inventors: Everett Waid, Fort Myers, FL (US); Timothy G Youngquist, Fort Myers, FL (US); John M Brown, Fort Myers, FL (US)

( * ) Notice: Subject to any disclaimer, the term of this patent is extended or adjusted under 35 U.S.C. 154(b) by 0 days.

(21) Appl. No.: 17/695,566

(22) Filed: Mar. 15, 2022

(65) Prior Publication Data

US 2022/0287279 A1 Sep. 15, 2022

Related U.S. Application Data

(60) Provisional application No. 63/161,442, filed on Mar. 15, 2021.

(51) Int. Cl.
*A01K 31/00* (2006.01)
*A01K 31/02* (2006.01)

(52) U.S. Cl.
CPC ............ *A01K 31/002* (2013.01); *A01K 31/02* (2013.01)

(58) Field of Classification Search
CPC ........ A01K 31/00; A01K 31/02; A01K 31/06; A01K 31/002
See application file for complete search history.

(56) References Cited

U.S. PATENT DOCUMENTS

| | | | | |
|---|---|---|---|---|
| 1,121,425 A | * | 12/1914 | Wakeman | A01K 31/002 119/492 |
| 1,199,205 A | * | 9/1916 | Riggin | A01K 31/002 119/494 |
| 2,129,221 A | * | 9/1938 | Lewis | E05D 15/403 16/245 |
| 2,392,678 A | * | 1/1946 | Loetscher | E06B 3/50 49/261 |
| 3,651,786 A | * | 3/1972 | Patterson | A01K 31/02 292/259 R |
| 3,990,400 A | * | 11/1976 | Shreckhise | A01K 31/002 119/494 |
| 5,913,286 A | * | 6/1999 | Showalter | A01K 45/005 119/843 |
| 6,557,958 B1 | * | 5/2003 | Motta | E05D 15/42 312/319.2 |
| 8,327,805 B2 | * | 12/2012 | Rogge | A01K 1/0064 119/493 |
| 10,869,457 B1 | * | 12/2020 | Brandley | A01K 1/0064 |
| 11,272,682 B2 | * | 3/2022 | Eversole | A01K 1/0064 |
| 2005/0166859 A1 | * | 8/2005 | Weaver | A01K 31/002 119/453 |
| 2009/0126156 A1 | * | 5/2009 | Ambrose | E05D 7/081 16/386 |
| 2017/0280689 A1 | * | 10/2017 | Fielder | A01K 31/02 |

* cited by examiner

*Primary Examiner* — Monica L Perry
*Assistant Examiner* — Aaron M Rodziwicz
(74) *Attorney, Agent, or Firm* — Stockwell & Smedley, PSC

(57) ABSTRACT

A door for use with a cage for transporting poultry including a door assembly for mounting the door to the cage which is configured to limit vibration associated with the transporting of poultry in the cage and prevent the unintentional opening of the door.

9 Claims, 16 Drawing Sheets

POULTRY TRANSPORT CAGE WITH DOOR ASSEMBLY

CROSS-REFERENCE TO RELATED APPLICATIONS

This application is a non-provisional U.S. patent application claiming the benefit of priority to U.S. provisional application No. 63/161,442 filed on Mar. 15, 2022, the contents of which are incorporated herein by reference in its entirety for all purposes.

FIELD OF THE INVENTION

The present invention relates to live poultry transport systems and methods for use, and more particularly, to a door assembly for a live poultry transport system and method.

BACKGROUND OF THE INVENTION

A typical modern chicken processing plant receives, slaughters and dresses from 50,000 to 300,000 chickens per day, and a few as many as 500,000 to 700,000 per day. The processing plant must have caged chickens at the plant ready to be unloaded and slaughtered in order to maintain a continuous operation. The live-haul operators are charged with this responsibility. The live-haul process has to be done efficiently and expeditiously in order both to keep the bird numbers flowing to the processing plant and to minimize untimely bird death.

The high daily throughput requirements of modern chickens processing plants in the United States has led to the development of improvements designed to facilitate rapid loading and unloading of caught chickens. Before these improvements were developed, caught chickens were deposited into wooden or plastic single compartment coops that opened at the top accessible from a closeable hatch. Coops were individually man-handled onto flatbed trailers and stacked in side-by-side columns to form rows of stacks that were then lashed to the trailer for transport to the processing plant. At the processing plant, these single compartment coops caused a bottleneck, because the chickens had to be withdrawn by hand. As processing plant slaughter line numbers and speed increased to meet growing sales demands, this bottleneck needed to be overcome, and in consequence, the modern steel chicken cage was developed and is universally used in today's high volume processing plants.

This cage includes a frame forming a generally rectangular multi-tied, multi-compartmented structure having over-the-center, spring loaded doors at the front of each compartment. The doors facilitate not only loading but unloading. At the processing plant the cage is tilted forward (towards the doors) causing the weight of the caged chickens to press against the doors until the spring load is overcome, snapping open the doors and allowed all the chickens in the cage to be dumped from the cage compartments onto wide conveyor collector belts leading to slaughter lines.

Poultry, especially chickens are extremely susceptible to shock and even dying from loud noises. During the process of hauling chickens from the farm to market a consistent percentage of birds will be dead by the time they reach the processing plant. The losses from dead birds can be significant. Many of the losses result from the methods described above and use of existing live haul cages, which are crudely constructed with cage doors that are extremely loud and jarring when moving, opening and closing.

Accordingly, for the above reasons and others, there is a need in the industry for improved poultry transport systems and methods that would, among other things, minimize the issues that then to cause potentially avoidable untimely bird death.

Accordingly, for the above reasons and others, there is a need in the industry for improved poultry transport systems and methods.

SUMMARY OF THE INVENTION

The invention is generally directed to systems and methods which addresses the issues cited above as well as other issues, among other things.

Some embodiments of the invention are directed a cage or similar structure used in transporting poultry which comprises a frame, the frame comprising opposing side, top and bottom frame members defining a cargo space opening, a door having a planar body attached to the frame by a door mounting assembly, the door mounting assembly enabling an opening operation of the door between a closed condition and an open condition, the closed condition including the door being in the cargo space opening and substantially parallel to the side frame members, the open condition including the door in a non-parallel position, transverse or angular position relative to the side frame members, wherein the door mounting assembly is configured to bias the door in the closed position to prevent unintentional opening and enable movement of the door between the open condition and the closed condition within a preset range of velocity with limited noise and vibration.

It should be understood that the cage may also comprise multiple frame structures to transport poultry, which may define multiple compartments or cells, with each being operatively associated with multiple door systems of the invention. In some embodiments of the aforementioned systems, the frame structure generally defines a rectilinear box with a plurality of tiered cubical or cuboid cells, each having doors systems of the invention including generally rectangular-shaped door panels.

In some embodiments, one or more door panels are pivotally mounted on a cage frame to substantially enclose each cell. The pivotal motion of the door, whether opening or closing, or both, is maintained by a mounting assembly at a controlled range of velocity for a relatively smoother operation with less vibration and noise. The mounting assembly further restricts vibration of the door panel when in the closed position, such as during transport, which further reduces movement and therefore noise of the door, such as the noise caused by the repetitive forceful contact of the door against the frame during transport, which tends to stress and cause the premature death of the live birds being transported therein.

In some embodiments, the door panel is configurable to be biased and/or otherwise securable to prevent the unintentional opening while also allowing for controlled opening within a desired range of velocity.

In some embodiments, the door and frame include cooperating engagement members for forming a non-permanent engagement to facilitate maintaining the door in a closed or other desired position with limited vibration.

Some embodiments of the invention are directed to an improvement to a cage used in transporting poultry, the cage being defined by opposing side members and opposing top and bottom members, at least two of the opposing side members and at least two of the opposing top and bottom members defining a cargo space opening, the improvement comprising: a door attached to the frame at each of the at least two opposing side members by a side member mounting assembly and opposing hinge pins, the opposing hinge pins each having a first end and a second end, the first end being engaged to the door and the second end being engaged with the at least two opposing side members, wherein the opposing hinge pins and the side member mounting assembly enables pivotal movement of the door between a closed condition and an open condition, the closed condition including the door being positioned in the cargo space opening and substantially parallel to the at least two opposing side members, and the open condition including the door being in a non-parallel position relative to the at least two opposing side members, the side member mounting assembly being configured to bias the door in the closed condition whereby unintentional opening of the door is prevented and pivotal movement of the door between the closed condition and the open condition is within a preset range of velocity, and wherein the side member mounting assembly includes an elongated arm having a spring disposed axially thereon and one or more assembly members configured to limit vibration of the door associated with transporting poultry in the cage and pivotal movement of the door between the closed condition and the open condition, the elongated arm being engaged at a first end with the door and engaged at a second end with one of the at least two opposing side members, the engagement of the elongated arm enabling axial movement of the elongated arm responsive to the pivotal movement of the door between the closed condition and the opened condition.

In some embodiments, the door further comprises a rectangular door panel having a planar body and opposing side ends.

In some embodiments, the first end of the opposing hinge pins is engaged with the at least two opposing side ends. The second end of the opposing hinge pins may be engaged with an opening in the at least two opposing side members. The second end of the opposing hinge pins may also be tapered and a spring may disposed axially on the opposing hinge pins.

In some embodiments, a flange is positioned at an intermediate position of the elongated arm. The spring may be disposed axially on the elongated arm between the flange and the engagement of the elongated arm with the opposing side member.

In some embodiments, the one or more assembly members comprise anti-vibration materials, such as tubes or washers, which may be made of a deformable material, including materials having suitable elasticity, high tear and tensile strength, resilience, and resistance to abrasion and friction, among other things, such as polymers like polyurethane, silicone, rubber or nylon for example.

Some embodiments of the invention are directed to a door assembly for a cage used in transporting poultry, the cage being defined by opposing posts and opposing lateral beams, at least two of the opposing posts and at least two of the opposing lateral beams defining a cargo space opening, the door assembly comprising: a door panel having a planar body and opposing side ends; opposing hinge pins, the opposing hinge pins each having a first end and a second end, the first end being engaged to the door panel and the second end being tapered and engaged with the at least two opposing posts; and a post mounting assembly, wherein the opposing hinge pins and the post mounting assembly enables pivotal movement of the door between a closed condition and an open condition, the closed condition including the door being positioned in the cargo space opening and substantially parallel to the at least two opposing posts, and the open condition including the door being in a non-parallel position relative to the at least two opposing posts, the post mounting assembly including an elongated arm having a spring disposed axially thereon and one or more assembly members configured to limit vibration associated with transporting poultry in the cage and pivotal movement of the door between the closed condition and the open condition, the elongated arm being engaged at a first end with the door panel and engaged at a second end with one of the at least two opposing posts whereby the engagement of the elongated arm enables axial movement of the elongated arm responsive to the pivotal movement of the door panel between the closed condition and the opened condition, the post mounting assembly being configured to bias the door panel in the closed condition whereby unintentional opening of the door panel is prevented.

In some embodiments of the door assembly, the first end of the opposing hinge pins is engaged with the at least two opposing side ends.

In some embodiments of the door assembly, the second end of the opposing hinge pins is engaged with an opening in the at least two opposing posts.

In some embodiments of the door assembly, the second end of the opposing hinge pins is tapered.

In some embodiments of the door assembly, a spring is disposed axially on the opposing hinge pins.

In some embodiments of the door assembly, a flange is positioned at an intermediate position of the elongated arm.

In some embodiments of the door assembly, the spring disposed axially on the elongated arm is positioned between the flange and the engagement of the arm with the post.

In some embodiments of the door assembly, the one or more assembly members comprise deformable washers.

In some embodiments of the door assembly, the door panel comprises a rectangular planar body and opposing side ends.

In some embodiments of the door assembly, a bracket is mounted at the opposing side ends of the door panel, and the bracket includes a protruding fin.

In some embodiments of the door assembly, each of the elongated arms are engaged at the first end with the protruding fin.

Some embodiments of the invention are also directed to a poultry transport system comprising: a frame structure configurable to transport poultry comprising; at least two frame structure sides; a frame structure top; a frame structure bottom; openwork joined to the frame structure said openwork configured for permitting airflow, wherein said frame structure and openwork at least partially defines cells configured for containing poultry during transport and at least one cargo space opening leading to a respective associated cell for containing poultry during transport.

In some embodiments, the aforementioned systems further comprise a door associated with respective cargo space openings wherein the door is configurable to be biased and/or otherwise securable to prevent the unintentional exit of poultry once inserted into a cell for transport.

In some embodiments of the aforementioned systems, the frame structure generally defines a rectilinear box.

BRIEF DESCRIPTION OF THE DRAWINGS

Various aspects of the present invention are illustrated by way of example, and not by way of limitation, in the accompanying drawings, wherein.

DETAILED DESCRIPTION

Figure 1:
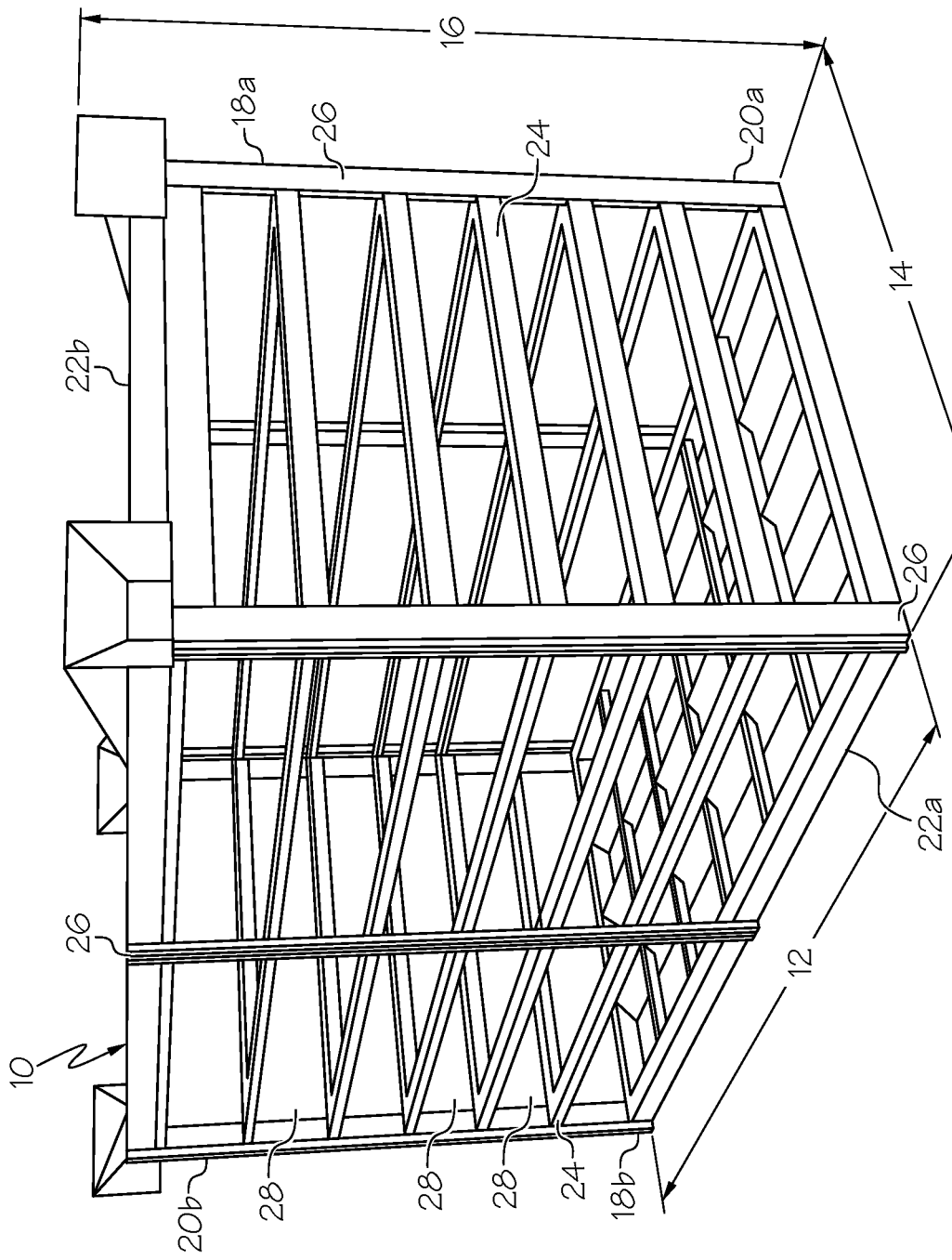
FIG. 1 depicts a three-dimensional side perspective view of an exemplary frame structure used for transporting poultry.

The detailed description set forth below in connection with the appended drawings is intended as a description of various embodiments of the invention and is not intended to represent the only embodiments in which the invention may be practiced. The detailed description includes specific details for the purpose of providing a thorough understanding of the invention. However, it will be apparent to those skilled in the art that the invention may be practiced without these specific details. In some instances, certain structures and components are not described or illustrated in order to avoid obscuring the concepts of the invention; additionally, sometimes attention is drawn to certain structure or features without depicting other associated structures.

The following description is provided to enable any person skilled in the art to practice the various embodiments described herein. Various modifications to these embodiments will be readily apparent to those skilled in the art, and the generic principles defined herein may be applied to other embodiments. Thus, the claims are not intended to be limited to the embodiments shown herein, but are to be accorded the full scope consistent with each claim's language, wherein reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference and are intended to be encompassed by this application. Moreover, nothing disclosed herein is intended to be dedicated to the public regardless of whether such disclosure is explicitly recited in any claim(s). No claim element is to be construed under the provisions of 35 U.S.C. § 112, sixth paragraph, unless the element is expressly recited using the phrase "means for" or, in the case of a method claim, the element is recited using the phrase "step for."

As will be appreciated by one skilled in the art(s), aspects of the present invention may be embodied as a method, system, or structure. The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. Aspects of the invention were chosen and described in order to best explain the principles of the invention and the practical application, and to enable others of ordinary skill in the art to understand the invention for various embodiments with various modifications as are suited to the particular use contemplated.

Figure 2B:
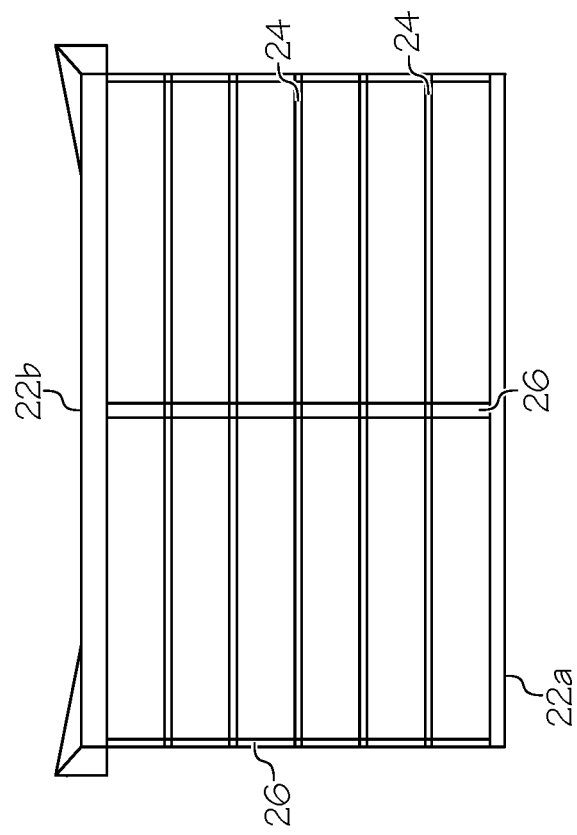
FIG. 2b is a side view of the exemplary frame structure shown in FIG. 1.
Figure 2A:
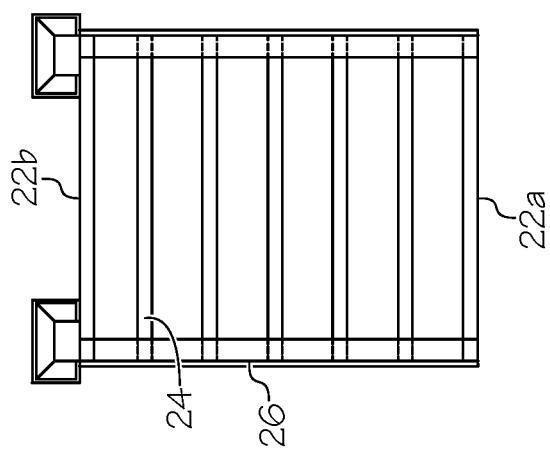
FIG. 2a is an end view of the exemplary frame structure shown in FIG. 1.

FIG. 1-2 depicts a three-dimensional diagram of a frame structure 10 having a length 12, a width 14 and height 16. The frame structure 10 has two generally complementary frame structure sides 18a and 18b generally oriented in a plane or plane parallel to both length 12 and height 16. The frame structure has two generally complementary frame structure ends 20a and 20b generally oriented in a plane or plane parallel to both width 14 and height 16. Frame structure 10 has a frame structure bottom 22a generally oriented with a plane parallel to both length 12 and width 14, as well as an opposing frame structure top 22b generally oriented with a plane parallel to the plane to which frame structure bottom 22a is orientated. Frame structure 10 is composed of opposing top and bottom members or lateral beams 24 connected between opposing side members or vertical posts 26, defining an array of cargo space openings 28 and the generally rectilinear form of frame structure 10.

Figure 3:
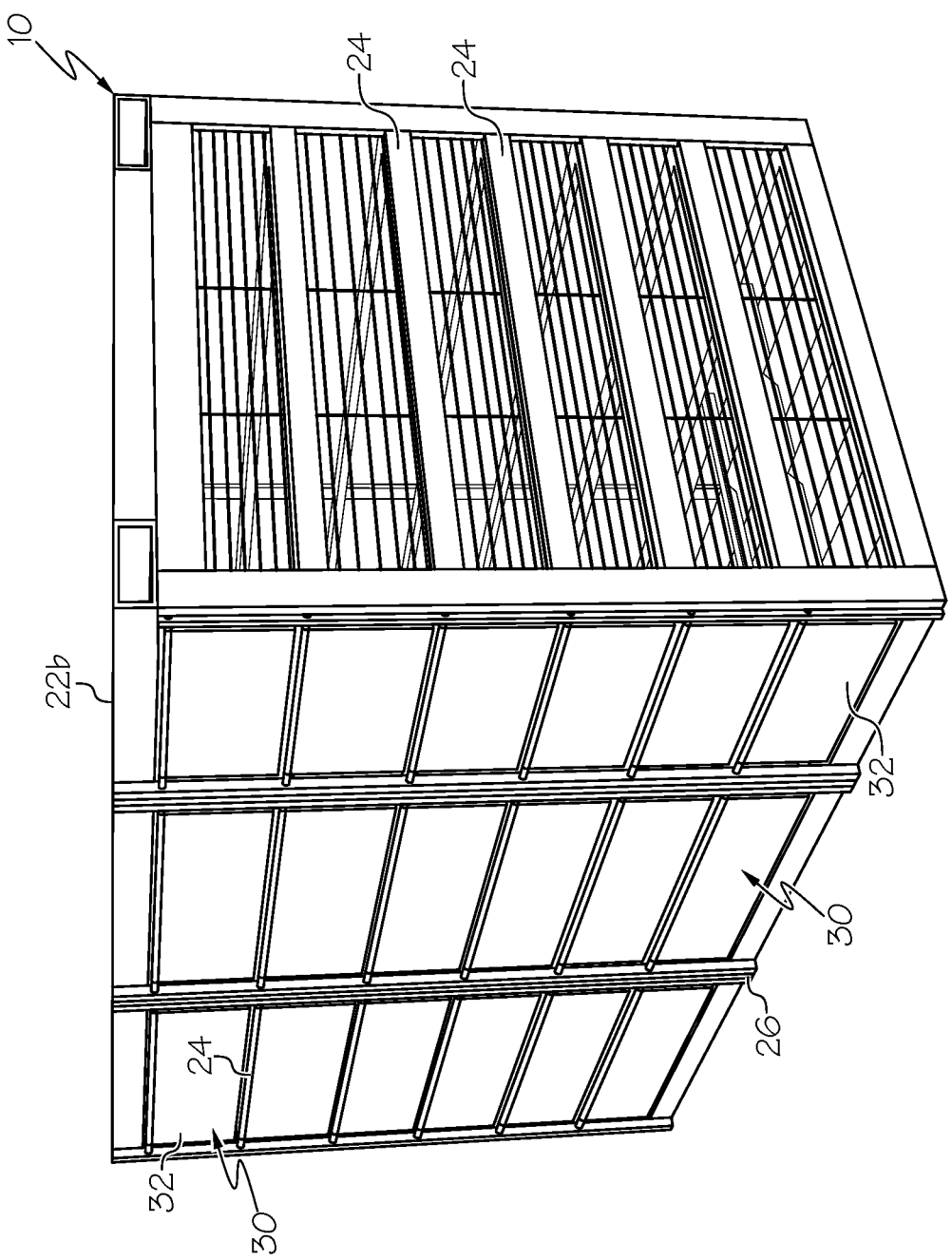
FIG. 3 is perspective view of the exemplary frame structure shown in FIG. 1 including a door constructed in accordance with the invention installed thereon.
Figure 4:
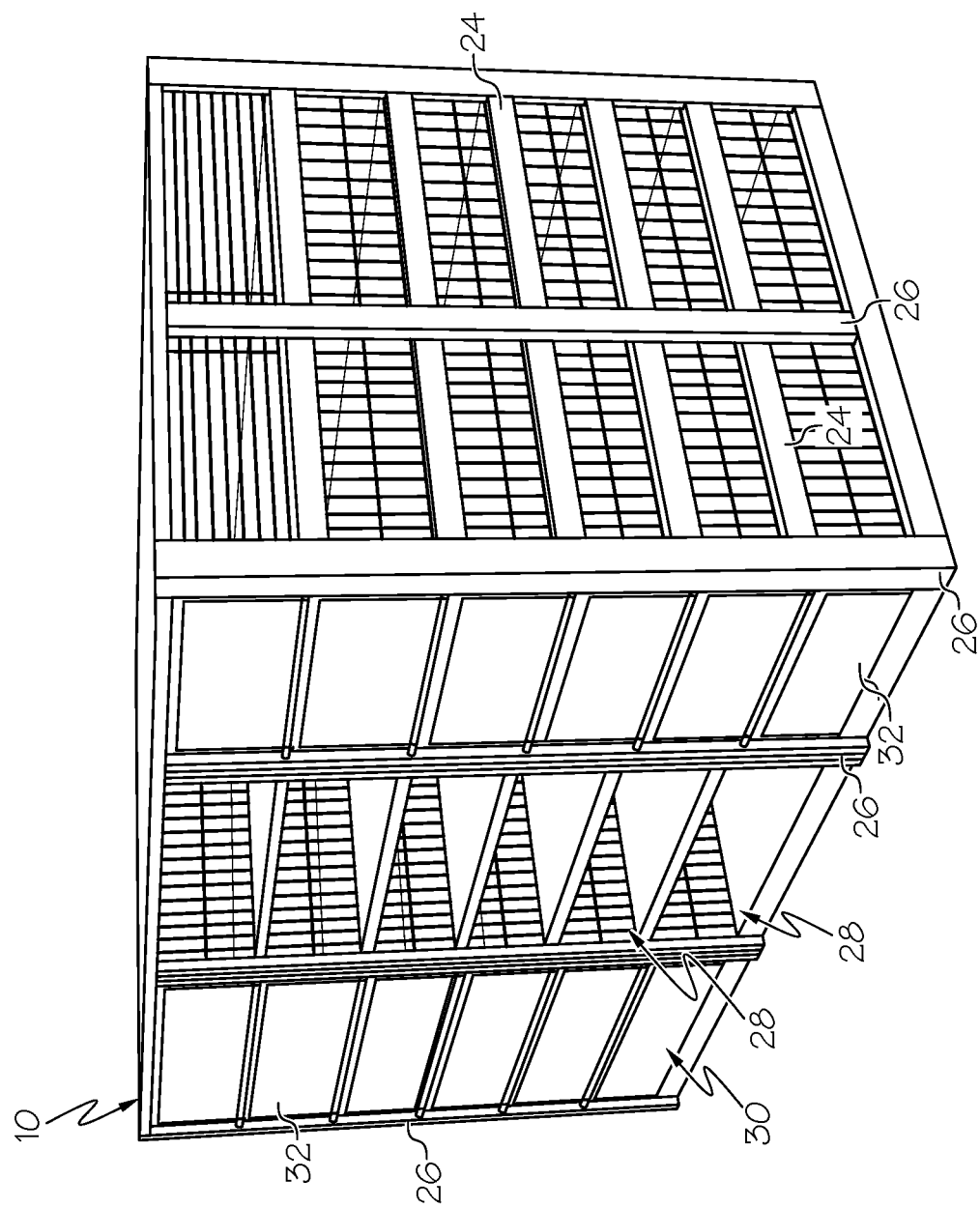
FIG. 4 is another perspective view of the frame structure with doors thereon shown in FIG. 3 illustrating, among other things, the cargo space openings of the frame structure which are enclosed by the door of the invention.
Figure 5:
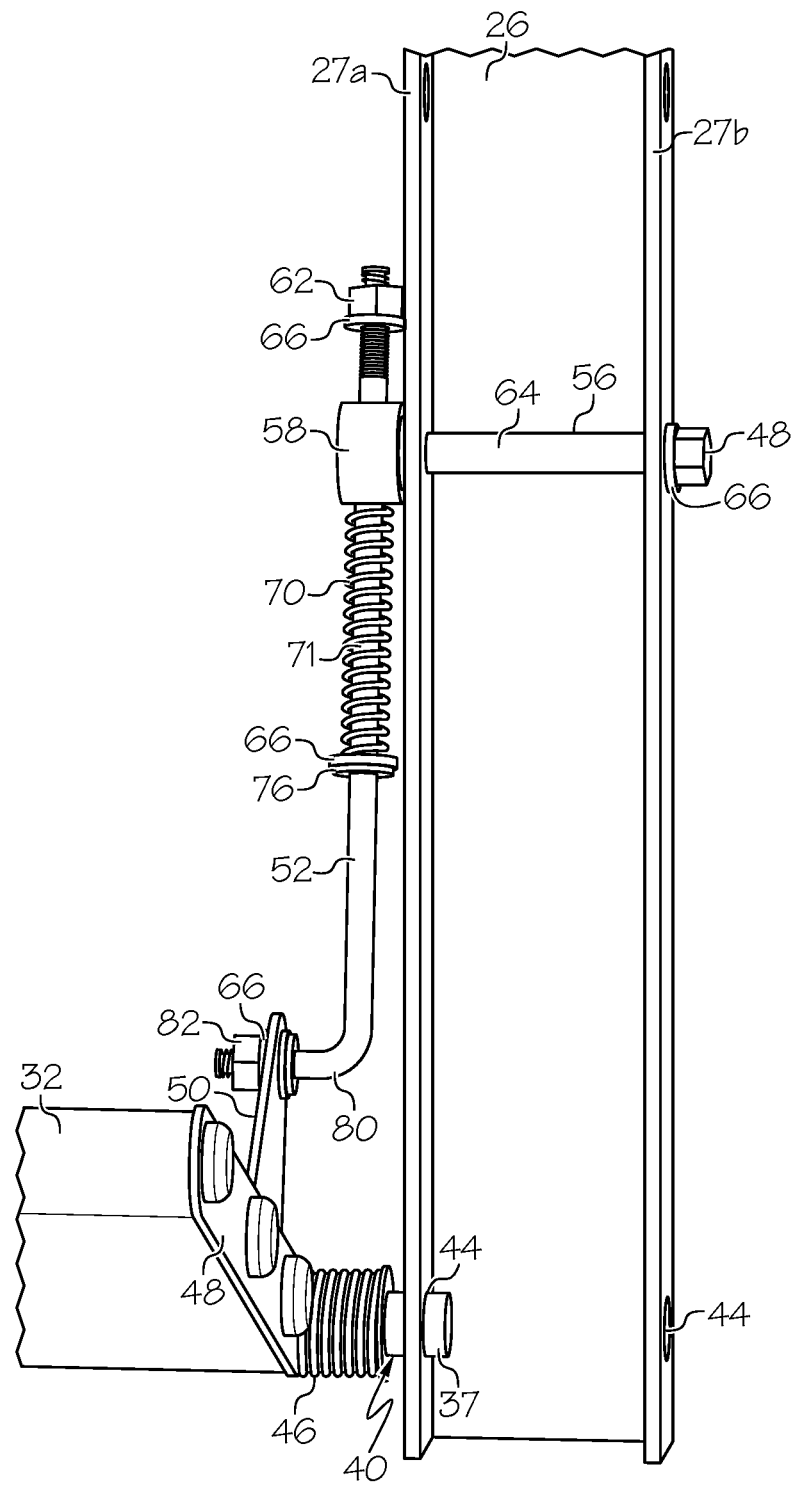
FIG. 5 is a schematic closeup view of a door of the invention illustrating a post mounting assembly constructed according to some embodiments of the door of the invention.

FIG. 3 shows frame structure 10 with doors 30 installed. Doors 30 are in a closed condition substantially covering cargo space openings 28 and substantially parallel in form with respect to the axes defined by posts 26 and beams 24. Each door 30 includes a door panel 32 and a post mounting assembly 34 pivotally mounting door panel 32 to frame structure 10. Door panel 32 includes laterally opposing side ends 36a and 36b, respectively, and opposing longitudinal sides 38a and 38b, respectively.

As shown in FIG. 4-15, post mounting assembly 34 includes two hinge pins 40 with each hinge pin 40 having a first end 35 seated respectively in a receiving port 42 defined in each lateral side ends 36a and 36b of door panel 32, and a second end 37 extending through a receiving hole 44 defined in lateral walls 27a and 27b of post 26. In this embodiment, second ends 37 of each hinge pin 40 are tapered such that the diameter of each second end 37 of hinge pin 40 is less than the diameter of first end 35 of each hinge pin 40. A spring 46 may be disposed axially over hinge pins 40 between the door panel 32 and post 26, that is, between a side end 36a or 36, or a bracket 48 discussed below, and a wall 27a or 27b of post 26. Spring 46 installed on hinge pins 40 adjacent both side ends 36a and 36b bias door panel 32 substantially centering door panel 32 relative to cargo space opening 28. A spring 47 may be disposed axially inside receiving port 42 of each lateral side end 36a and 36b which contacts first end 35 of hinge pin 40 to bias hinge pin 40 axially outward into receiving hole 44 of posts 26.

Bracket 48 is mounted on side end 36a. It should be understood that bracket 48 may also be mounted on side end 36b. Bracket 48 includes a protruding fin 50. Fin 50 is defined on bracket 48 to protrude substantially perpendicular relative to door panel 32 from an intermediate position of a side end 36a.

In some embodiments, post mounting apparatus 34 includes an arm 52 engaged at a first end with fin 50. Post mounting apparatus 34 further includes a trunnion 56 having a head 58 with a hole 60 therein for receiving a second end of arm 52, thus connecting side end 36a of door panel 32 to one of the adjacent posts 26, in addition to the engagement formed by hinge pins 40 with both adjacent posts 26. Head 58 in this embodiment is generally cylindrical in shape but may be other shapes and configurations. Arm 52 may be secured in place through trunnion head 58 by any conventional means such as by having threading for engagement with a nut 62.

Trunnion 56 includes a bolt 64 which extends through, and is secured to, a post 26 by any conventional means which enables rotational motion of trunnion head 58 relative to post 26, such as by a vibration reducing assembly or engagement members which in this embodiment include deformable, anti-vibration or otherwise sound dampening washer 66 held in place on bolt 64 by a nut 68. A spring 70 is disposed axially over the exterior of arm 52 and tensioned by contact at a first end 72 with trunnion head 58 and at a second end 74 by a flange 76 in arm 52 upon pivoting door 30 into the closed condition. In this embodiment an anti-vibration deformable tube 71 is disposed over arm 52 under spring 70. Flange 76 supports a deformable, anti-vibration or otherwise sound dampening washer 66 in contact with second end 74 of spring 70. A washer 66 is also positioned between trunnion head 58 and post 26. Flange 76 may be positioned in between opposing ends of arm 52 which is also secured to fin 50 by any conventional means such as an elbow 80 defining a threaded end portion extending through a hole 51 in fin 50 with nut 82 securing arm 52 to fin 50.

Figure 6:
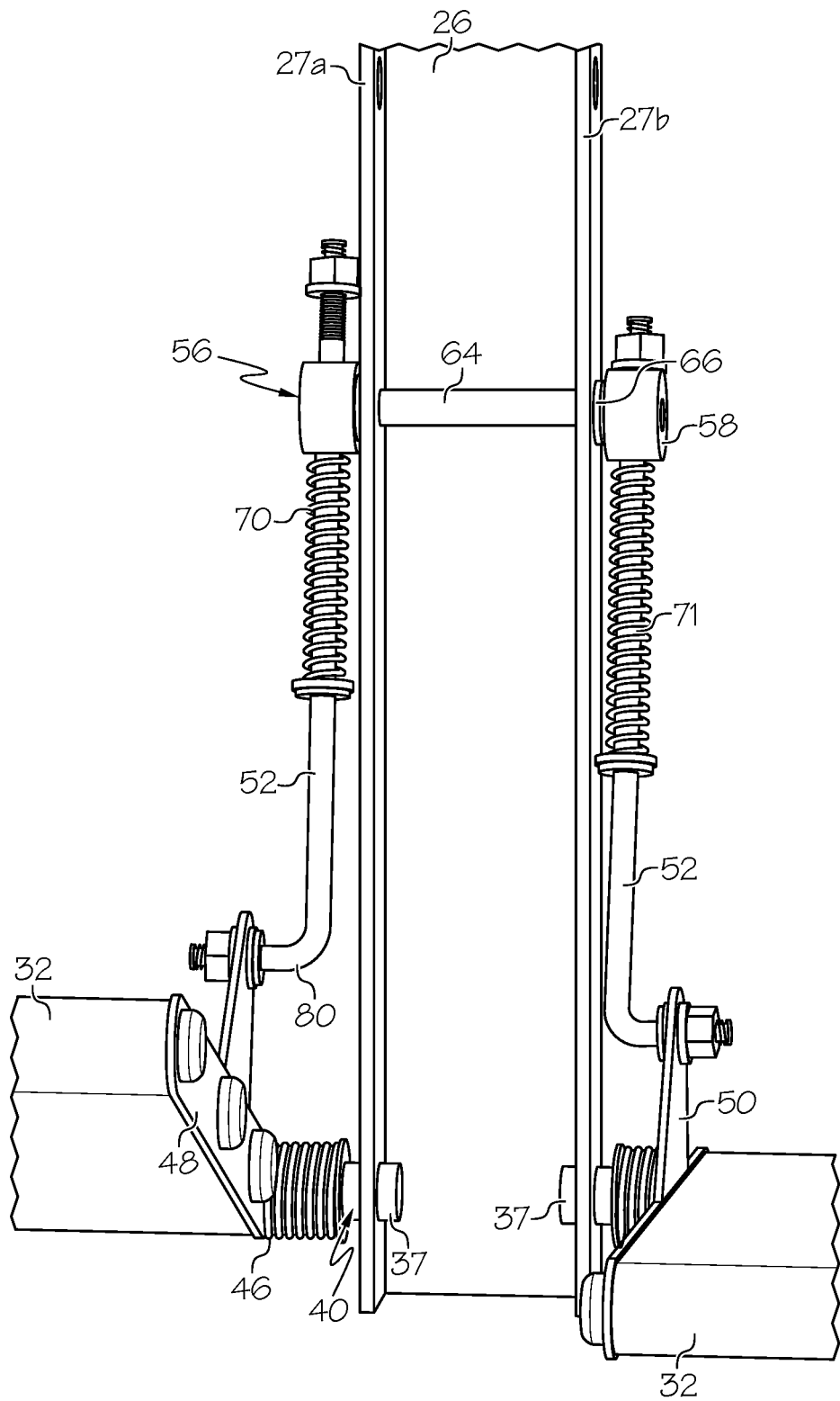
FIG. 6 is a schematic closeup, partial front view of a door of the invention illustrating a post mounting assembly used for laterally adjacent doors connected to a post of the frame structure which is constructed according to some embodiments of the door of the invention.
Figure 7:
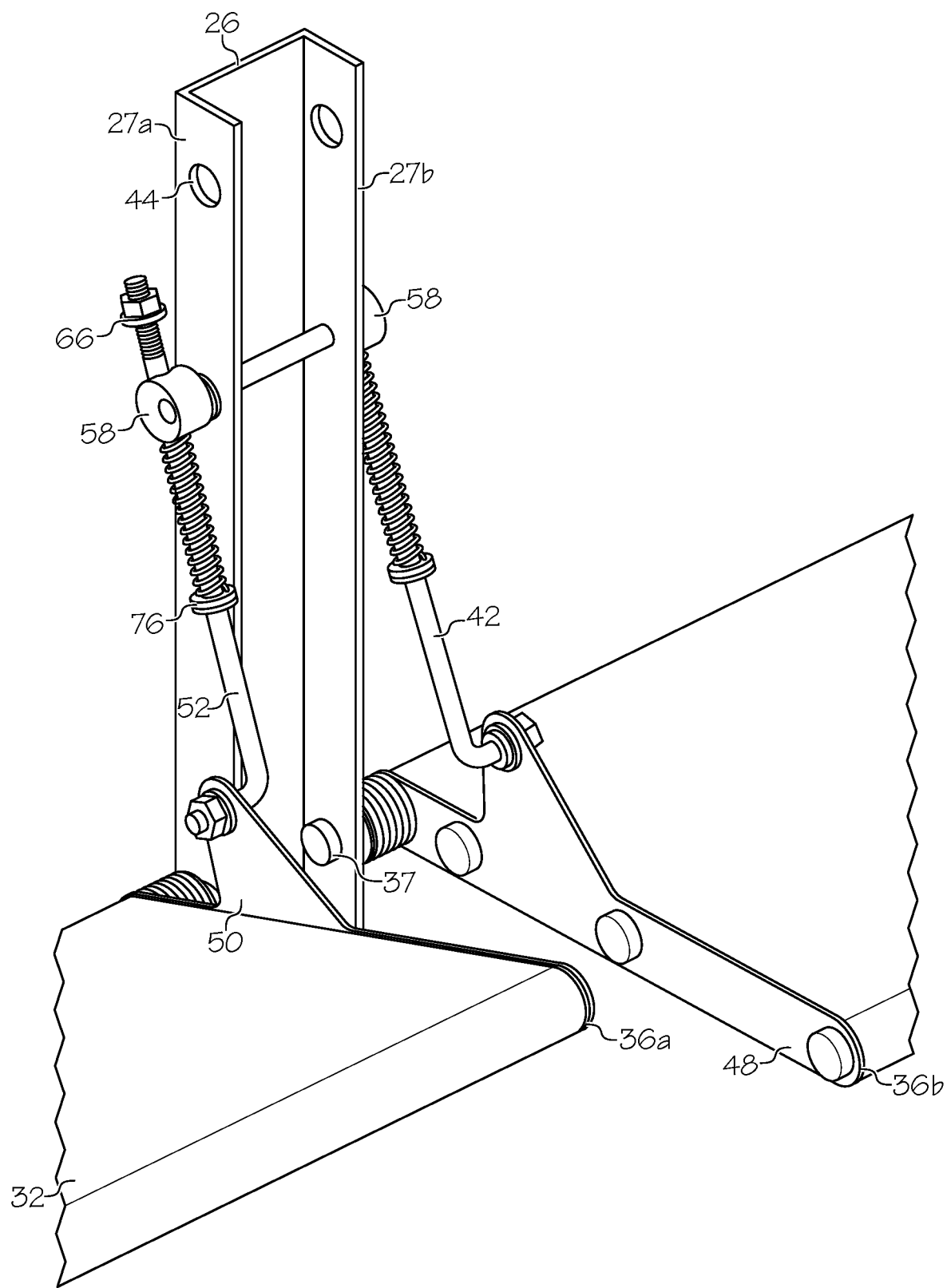
FIG. 7 is a schematic closeup, partial perspective view of a door of the invention illustrating the post mounting assembly of FIG. 6.
Figure 8:
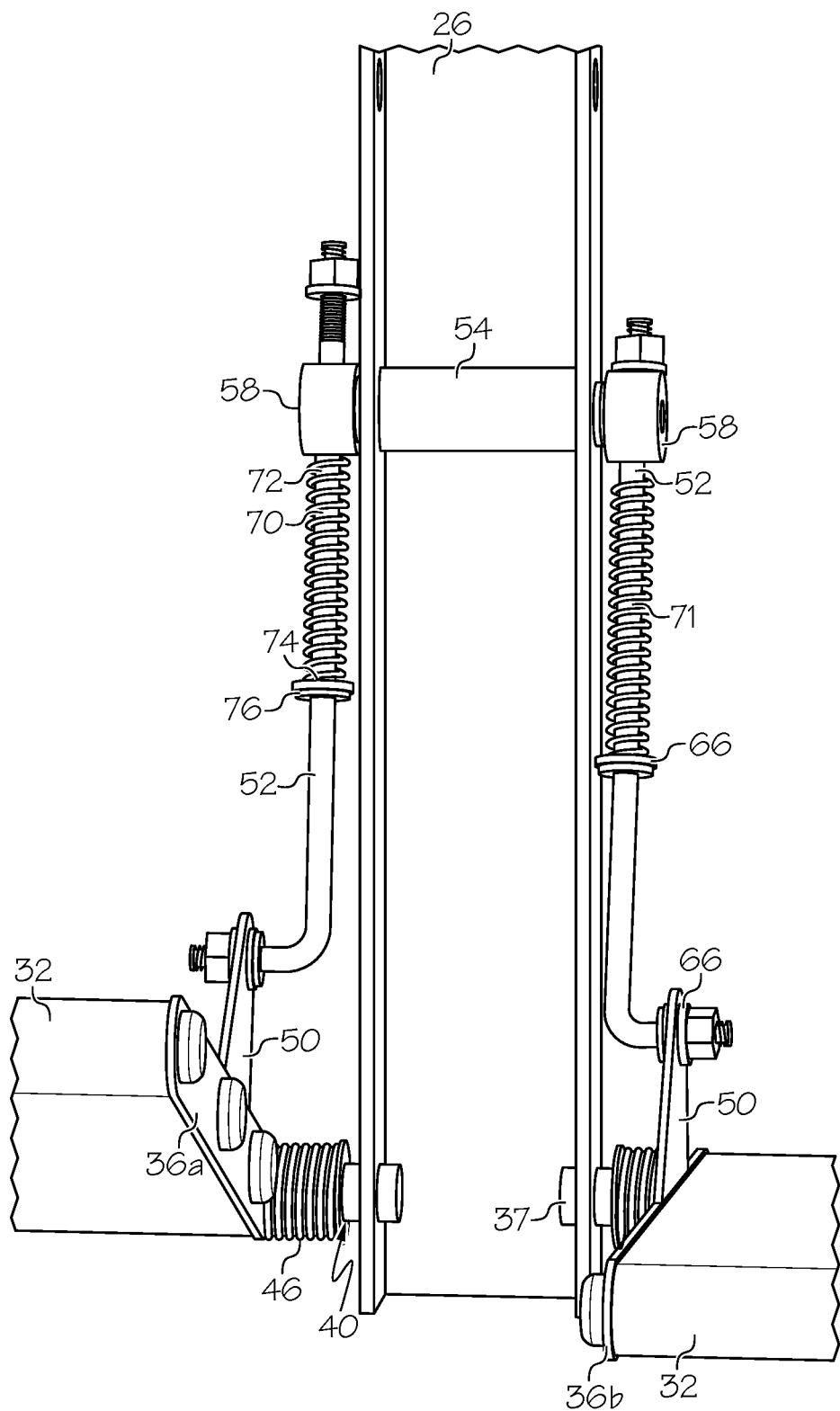
FIG. 8 is a schematic closeup, partial front view of a door of the invention illustrating a post mounting assembly used for laterally adjacent doors connected to a post of the frame structure which is constructed according to some embodiments of the door of the invention.
Figure 9:
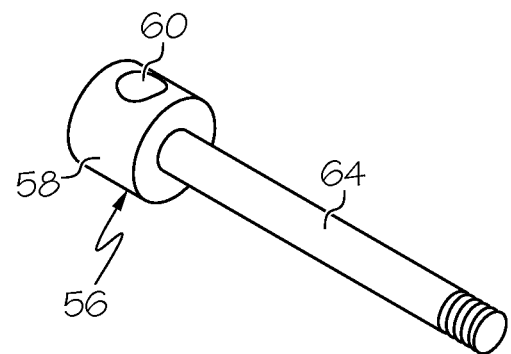
FIG. 9 is a perspective view of a trunnion used in the post mounting assembly of a door constructed according to some embodiments of the invention.
Figure 10:
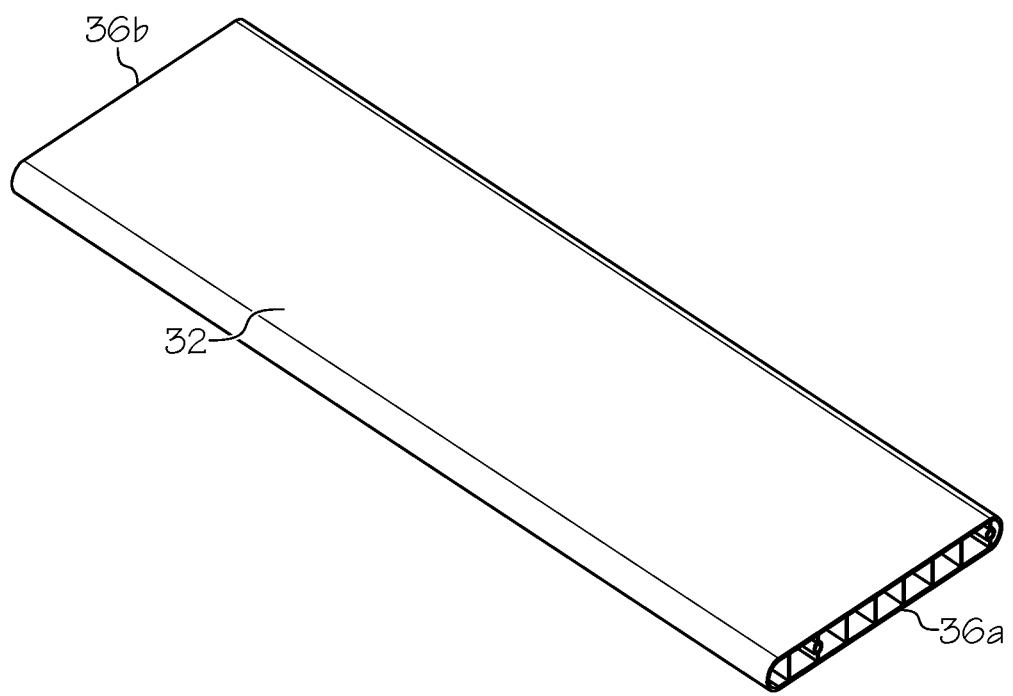
FIG. 10 is a perspective view of a door panel used in a door constructed according to some embodiments of the invention.
Figure 11:
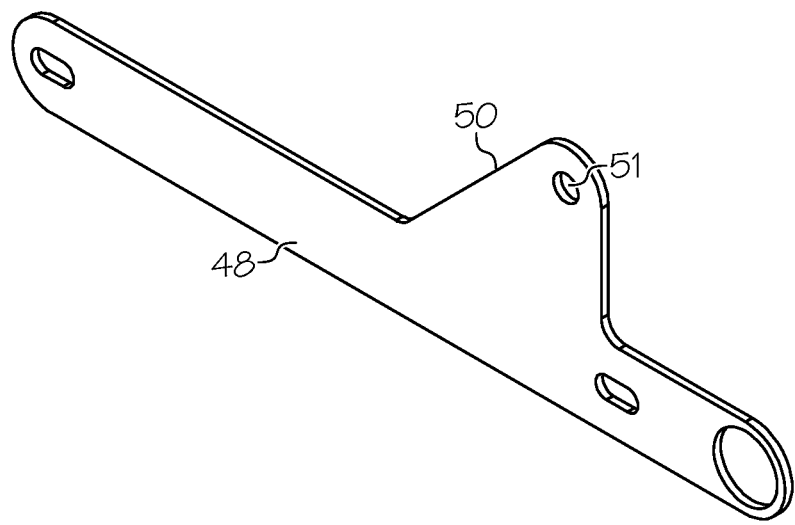
FIG. 11 is a perspective view of a door panel bracket used in a door constructed according to some embodiments of the invention.
Figure 12:
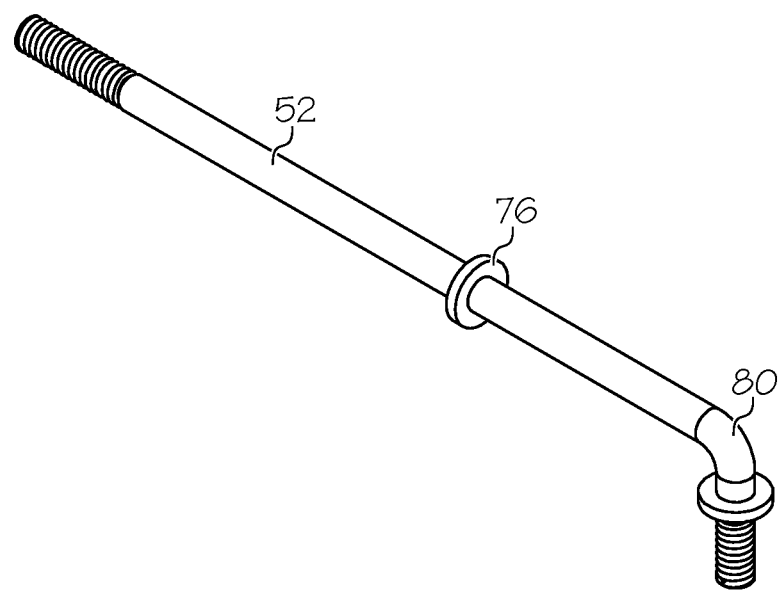
FIG. 12 is a perspective view of an arm used in the post mounting assembly of a door constructed according to some embodiments of the invention.
Figure 13:
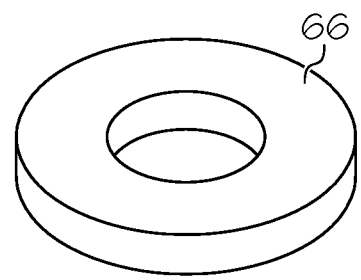
FIG. 13 is a perspective view of a vibration dampening washer used in the post mounting assembly of a door constructed according to some embodiments of the invention.
Figure 14:
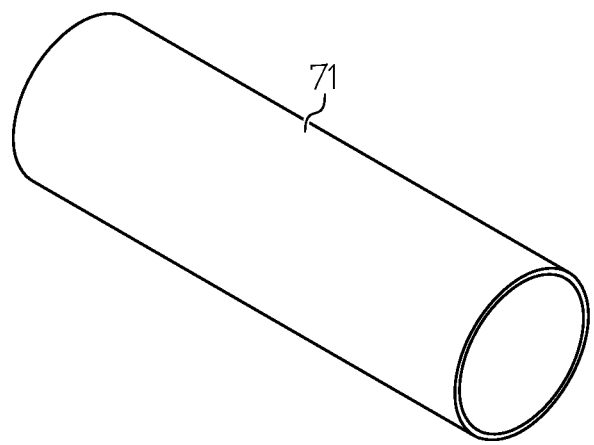
FIG. 14 is a perspective view of a vibration dampening tube used in the post mounting assembly of a door constructed according to some embodiments of the invention.
Figure 15:
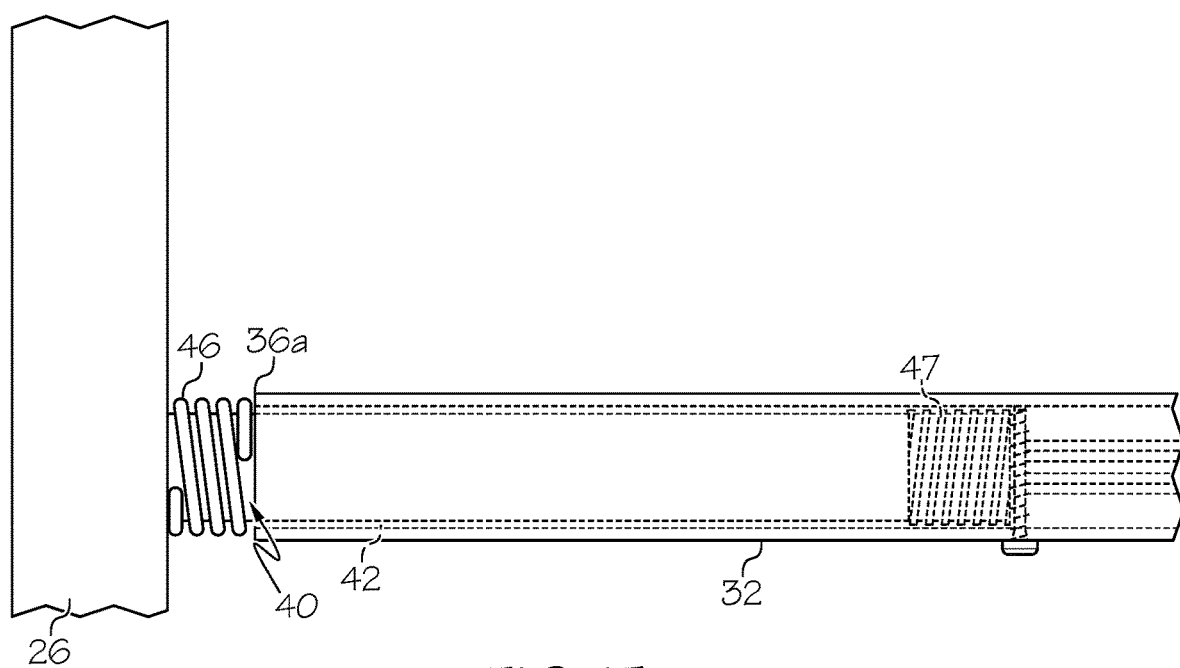
FIG. 15 is a front view illustrating the engagement between a hinge pin and a door panel used in the post mounting assembly of a door constructed according to some embodiments of the invention.

As shown particularly in FIG. 6-7, bolt 64 may connect on either opposing end with two trunnion heads 58, such that each trunnion head 58 is positioned on the exterior side of a post 26 having opposing lateral walls 27a and 27b. Trunnion heads 58 may be engaged with bolt 64 through a conventional means, such as bolt 64 having dual threaded ends and trunnion heads 58 having cooperating threaded ports for receiving bolt 64. Trunnion heads 58 support of two laterally adjacent post mounting assemblies 34 and door panels 32. A washer 66 is positioned between trunnion heads 58 and side walls 27a and 27b, respectively. In some embodiments, as shown particularly in FIG. 8, a sounds or vibration suppression tube 54, which may be constructed of a deformable material, is disposed over bolt 64 to reduce vibration and sound associated with the rotational movement of trunnion heads 58 and the opening and closing of laterally adjacent doors 30.

In operation, door 30 is biased to remain in the closed condition parallel with posts 26 and beams while also being enabled for pivotal motion into the open condition wherein door 30 is in a transverse, angled relationship with respect to the longitudinal axis of posts 26 and whereby cargo opening port 32 is uncovered. When moved into the closed condition, arm 52 moves axially through trunnion head 58 biased by springs 70 and 46 on hinge pins 40, which also maintain panel 32 in position without lateral movement relative to post 26, and arm 52 becomes positioned within the cargo opening space as a result of the engagement with fin 50. When moved into the open condition arm 52 moves axially through trunnion head 58 biased by springs 70 and 46 and held in the open condition by the engagement of arm 52 with trunnion head 58.

Figure 16:
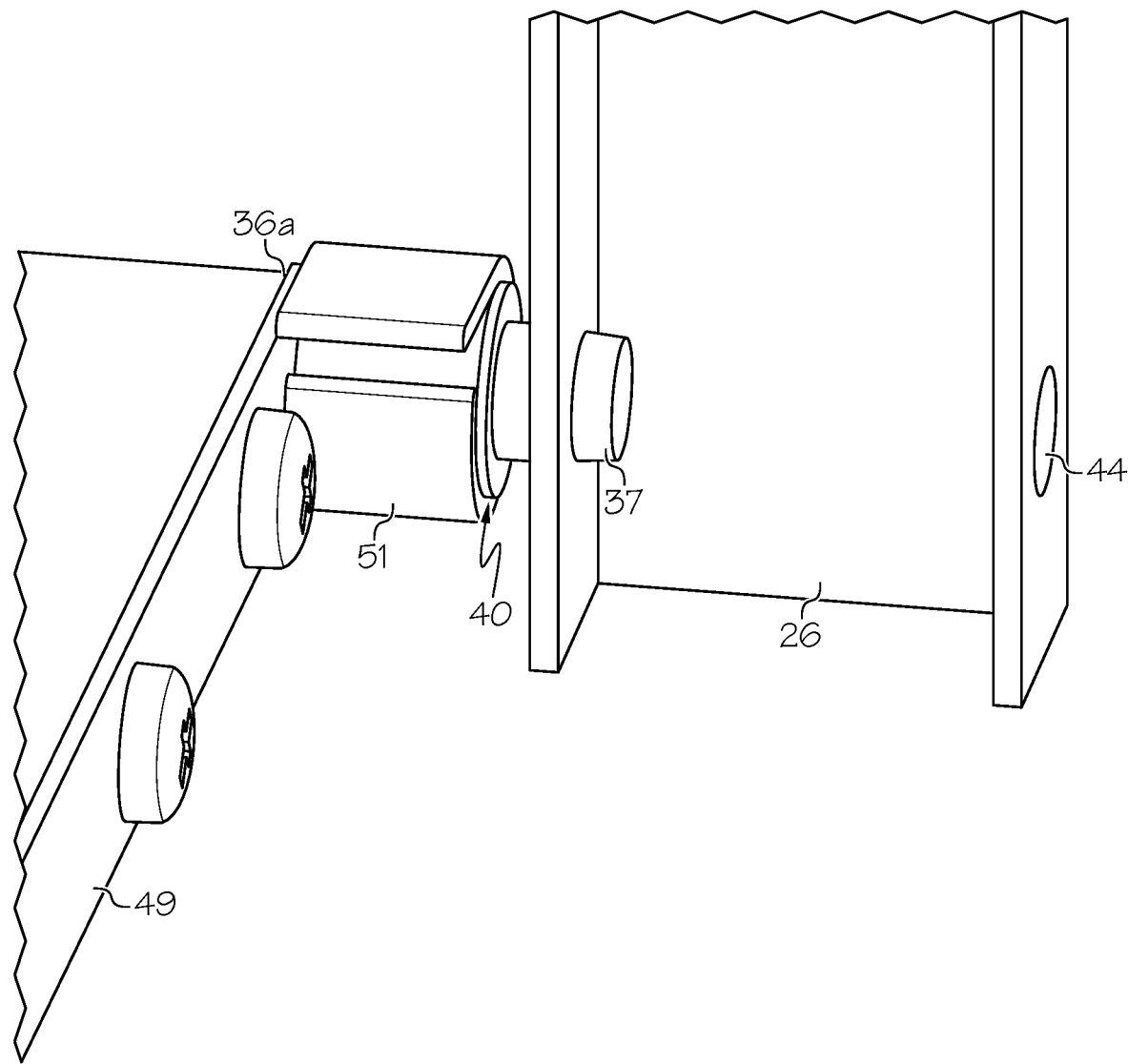
FIG. 16 is a closeup partial perspective view illustrating another embodiment of the invention illustrating a hinge pin maintained in position with a spacer.

FIG. 16 illustrates an end 36a of panel 32 of door 30 which is part of post mounting assembly 34, further supporting the other components of post mounting assembly 34, such as trunnion 56 which are installed at the opposing end 36b of panel 32. A bracket 49 without a fin 50 is installed over end 36a by conventional means, such as screws. A hinge pin 40 having a tapered second end 37 extends through a receiving hole 44 of post 26 to facilitate the mounting of door pane 32 for pivotal motion between the open condition and the closed condition. In this embodiment, a clip 51 is covering hinge pin 40 to restrict lateral movement of panel 32 and maintain hinge pin 40 and panel 32 in the same lateral position relative to post 26, such as in a substantially equidistant position between arms 26 relative to cargo port opening 28 when in the closed condition.

Figure 17:
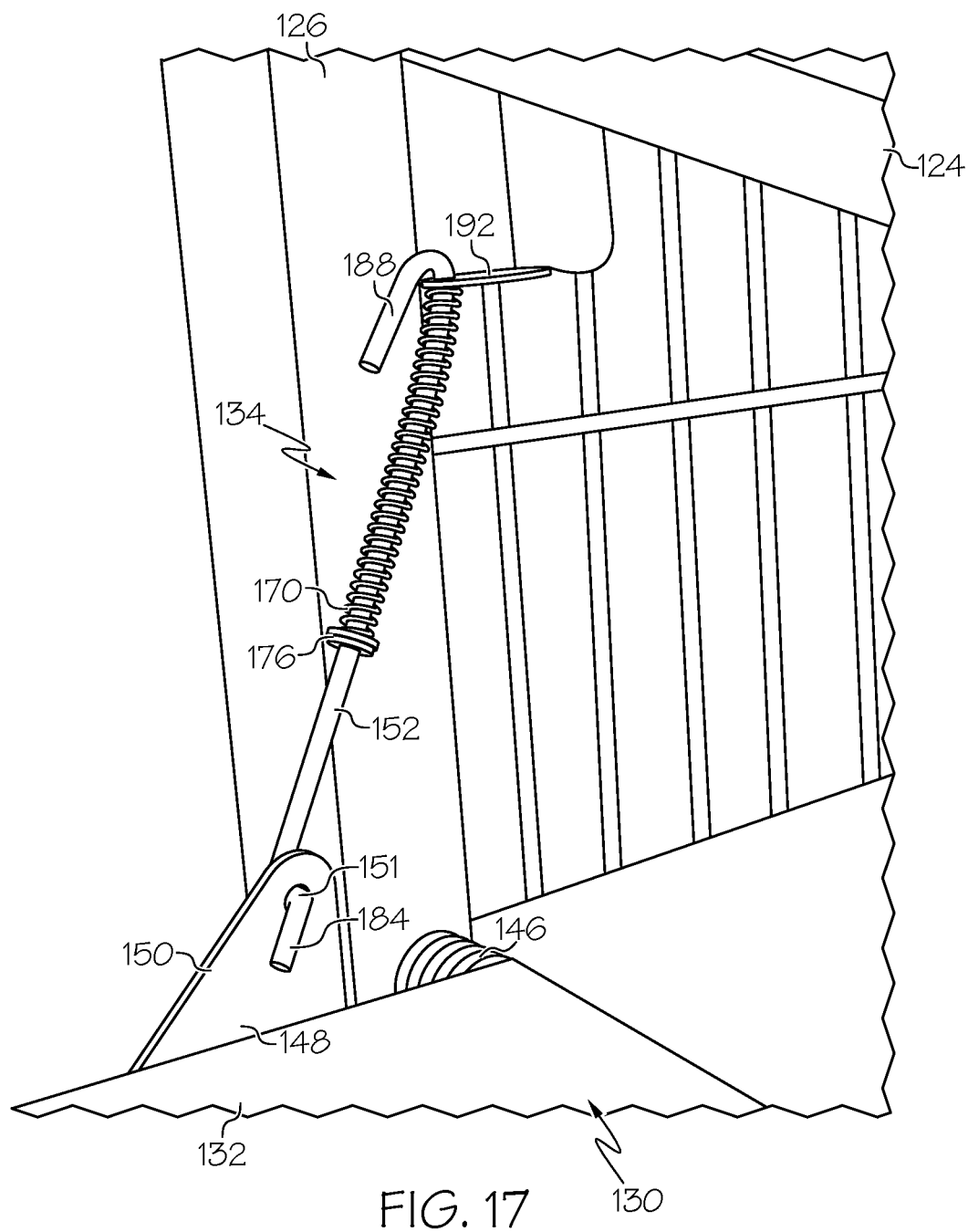
FIG. 17 is a perspective view illustrating another embodiment of a post mounting assembly of a door of the invention with the door in the open condition.
Figure 18:
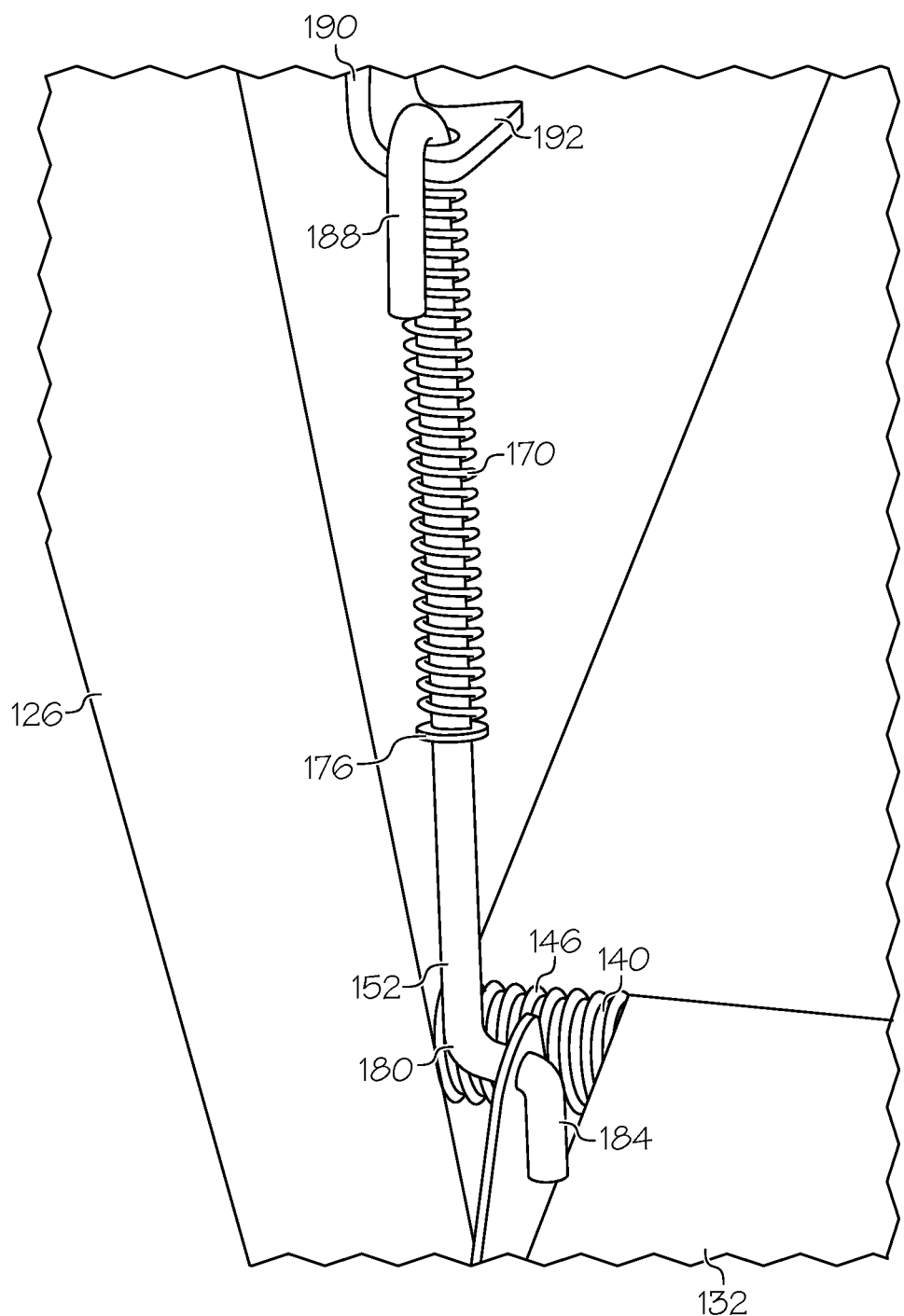
FIG. 18 is another perspective view of the post mounting assembly shown in FIG. 17 with the door in the open condition.
Figure 19:
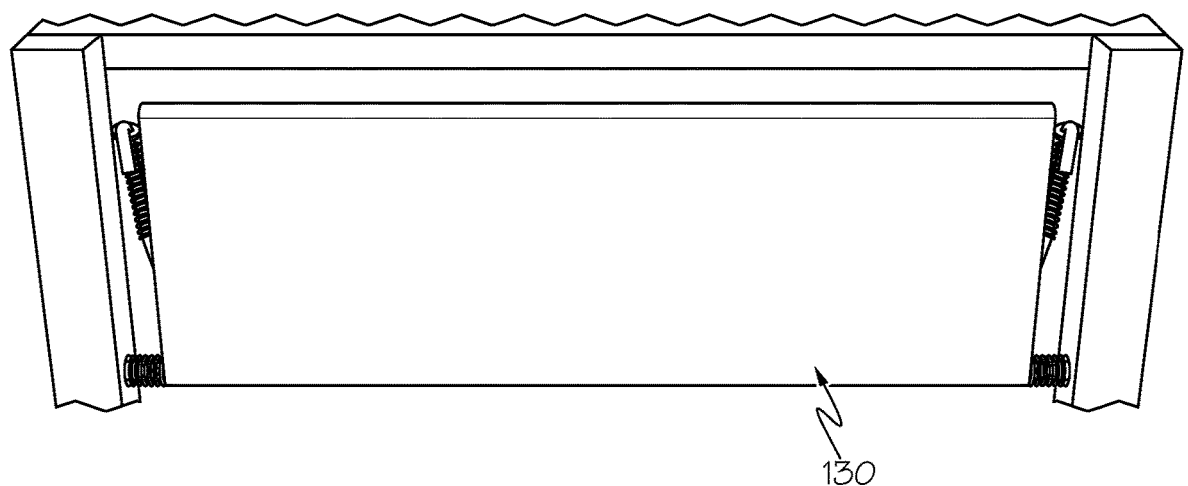
FIG. 19 is another perspective view of the post mounting assembly shown in FIG. 17 with the door in the closed condition.

In another embodiment, a post mounting apparatus 134 as shown in FIG. 17-19 comprises a bracket 148 with a fin 150. Arm 152 at a first end is engaged with fin 150 by elbows 180 and 184 extending through a hole 151 in fin 150. Arm 152 at a second end includes a hook 188 which is engaged with an opening 190 in a bracket 192 connected to post 126. In operation, door 130 is pivotally moved between the open condition and closed condition whereby arm 152 moves axially through opening 190 while compressing spring 170 disposed axially on arm 152 against bracket 192 and flange 176. When door 130 is in closed condition, hook 188 holds door panel 132 in place by contact with bracket 192.

It should be understood that a door of the invention may be moved from open to closed conditions by a variety of mechanisms, such as for example, a piano hinge, push open push close mechanism, or tensioned spring may be utilized to help bias the door open and/or closed.

Embodiments of the invention include door systems with door mounting assemblies for existing cages and for new cages in the poultry industry that result in a smoother operating door that retains the strength required to hold the birds in place while significantly reducing the noise of the door operation and vibration of the door in operation or when secured in position. The door assembly of the invention is able to withstand loads in excess of at least 250 lbs, extreme cold temperatures such as below-freezing and ease the binding of existing doors that results from drag and resistance in the opening and closing processes.

It should be understood that no limitation of the scope of the invention is intended by the examples provided. It should also be understood that the aforementioned embodiments of the invention may be of any size or shape. Any alterations and further modifications of any inventive feature illustrated herein, and any additional applications of the principles of the invention as illustrated herein which would normally occur to one skilled in the relevant art and having possession of this disclosure are to be considered within the scope of the invention claimed.

This written description uses examples to disclose the invention and also to enable any person skilled in the art to practice the invention, including making and using any devices or systems and performing any incorporated methods. The patentable scope of the invention is defined by the claims, and may include other examples that occur to those skilled in the art. Other aspects and features of the invention can be obtained from a study of the drawings, the disclosure, and the appended claims. The invention may be practiced otherwise than as specifically described within the scope of the appended claims. It should also be noted, that the steps and/or functions listed within the appended claims, notwithstanding the order of which steps and/or functions are listed therein, are not limited to any specific order of operation.

While exemplary apparatus, systems and methods of the invention have been described herein and in the accompanying documents, it should also be understood that the foregoing is only illustrative of a few particular embodiments with exemplary and/or preferred features, as well as principles of the invention, and that various modifications can be made by those skilled in the art without departing from the scope and spirit of the invention. Therefore, the described embodiments should not be considered as limiting of the scope of the invention in any way. Accordingly, the invention embraces alternatives, modifications and variations which fall within the spirit and scope of the invention as set forth herein, by the claims and any equivalents thereto.

We claim:

1. An improvement to a cage used in transporting poultry, the cage being defined by opposing side members and opposing top and bottom members, at least two of the opposing side members and at least two of the opposing top and bottom members defining a cargo space opening, the improvement comprising:
   a door attached to a frame at each of the at least two opposing side members by a side member mounting assembly and opposing hinge pins, the opposing hinge pins each having a first end and a second end, the first end being engaged to the door and the second end being engaged with the at least two opposing side members, wherein the opposing hinge pins and the side member mounting assembly enables pivotal movement of the door between a closed condition and an open condition, the closed condition including the door being positioned in the cargo space opening and substantially parallel to the at least two opposing side members, and the open condition including the door being in a non-parallel position relative to the at least two opposing side members, the side member mounting assembly being configured to bias the door in the closed condition whereby unintentional opening of the door is prevented and pivotal movement of the door between the closed condition and the open condition is within a preset range of velocity, and wherein the side member mounting assembly includes an elongated arm having a spring disposed axially thereon and one or more assembly members configured to limit vibration of the door associated with transporting poultry in the cage and pivotal movement of the door between the closed condition and the open condition, the elongated arm being engaged at a first end with the door and engaged at a second end with one of the at least two opposing side members, the engagement of the elongated arm enabling axial movement of the elongated arm responsive to the pivotal movement of the door between the closed condition and the opened condition.

2. The improvement to a cage used in transporting poultry according to claim 1, wherein the door further comprises a rectangular door panel having a planar body and opposing side ends.

3. The improvement to a cage used in transporting poultry according to claim 2, wherein the first end of the opposing hinge pins is engaged with the at least two opposing side ends.

4. The improvement to a cage used in transporting poultry according to claim 3, wherein the second end of the opposing hinge pins is engaged with an opening in the at least two opposing side members.

5. The improvement to a cage used in transporting poultry according to claim 4, wherein the second end of the opposing hinge pins is tapered.

6. The improvement to a cage used in transporting poultry according to claim 5, further comprising a spring disposed axially on the opposing hinge pins.

7. The improvement to a cage used in transporting poultry according to claim 6, further comprising a flange at an intermediate position of the elongated arm.

8. The improvement to a cage used in transporting poultry according to claim 7, wherein the spring disposed axially on the elongated arm is positioned between the flange and the engagement of the elongated arm with the one opposing side member.

9. The improvement to a cage used in transporting poultry according to claim 8, wherein the one or more assembly members comprise deformable washers.

* * * * *